(12) United States Patent
Teh

(10) Patent No.: US 9,369,044 B2
(45) Date of Patent: Jun. 14, 2016

(54) MULTI-PHASE POWER CIRCUIT

(71) Applicant: KABUSHIKI KAISHA TOSHIBA, Minato-ku (JP)

(72) Inventor: Chen Kong Teh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 11 days.

(21) Appl. No.: 14/013,779

(22) Filed: Aug. 29, 2013

(65) Prior Publication Data

US 2014/0253066 A1    Sep. 11, 2014

(30) Foreign Application Priority Data

Mar. 5, 2013   (JP) .................................. 2013-42794

(51) Int. Cl.
G05F 1/00        (2006.01)
H02M 3/158       (2006.01)

(52) U.S. Cl.
CPC .... *H02M 3/1584* (2013.01); *H02M 2003/1586* (2013.01)

(58) Field of Classification Search
USPC ............ 323/225, 268, 271, 272, 350; 363/65; 307/82
See application file for complete search history.

(56) References Cited

U.S. PATENT DOCUMENTS

| 7,564,228 B2 | 7/2009 | Yabuzaki |
| 7,782,032 B2* | 8/2010 | Taufik et al. ................... 323/272 |
| 7,817,446 B2 | 10/2010 | Endo et al. |
| 8,120,339 B2 | 2/2012 | Kawase et al. |
| 2002/0135338 A1* | 9/2002 | Hobrecht et al. ............. 323/272 |
| 2006/0152205 A1* | 7/2006 | Tang .................... H02M 3/1584 323/284 |
| 2008/0067988 A1 | 3/2008 | Yabuzaki |
| 2008/0129260 A1* | 6/2008 | Abu Qahouq et al. ........ 323/272 |
| 2008/0303495 A1* | 12/2008 | Wei et al. ....................... 323/272 |
| 2009/0189583 A1 | 7/2009 | Kawase et al. |
| 2011/0025284 A1* | 2/2011 | Xu ....................... H02M 3/1584 323/282 |
| 2011/0062930 A1* | 3/2011 | Houston ............. H02M 3/1584 323/284 |
| 2011/0133708 A1* | 6/2011 | Shiwaya ....................... 323/271 |
| 2013/0027009 A1* | 1/2013 | Tang et al. .................... 323/271 |
| 2014/0015500 A1* | 1/2014 | Babazadeh et al. ........... 323/272 |

FOREIGN PATENT DOCUMENTS

| JP | 2003-134805 A | 5/2003 |
| JP | 2007-124850 A | 5/2007 |
| JP | 2008-072872 A | 3/2008 |

(Continued)

OTHER PUBLICATIONS

Japanese Office Action issued on Jun. 23, 2015 in corresponding Japanese Application No. 2013-042794, along with English translation thereof.

(Continued)

*Primary Examiner* — Adolf Berhane
*Assistant Examiner* — Alex Torres-Rivera
(74) *Attorney, Agent, or Firm* — White & Case LLP

(57) ABSTRACT

According to one embodiment, a power circuit includes an input terminal 1 to which a DC input voltage is applied, an output terminal 2, a first DC/DC converter which receives the DC input voltage and supplies a first phase output current to the output terminal 2, a second DC/DC converter which supplies an output current lower than the first phase output current to the output terminal in a second phase which is different from the first phase, and a controller which controls operations of the first and second DC/DC converters.

8 Claims, 9 Drawing Sheets

(56) References Cited

FOREIGN PATENT DOCUMENTS

| | | |
|---|---|---|
| JP | 2008-141801 A | 6/2008 |
| JP | 2009-177997 A | 8/2009 |
| JP | 2012-029465 A | 2/2012 |

OTHER PUBLICATIONS

Japanese Office Action issued on Feb. 16, 2016 in corresponding Japanese Application No. 2013-042794, along with English translation thereof.

* cited by examiner

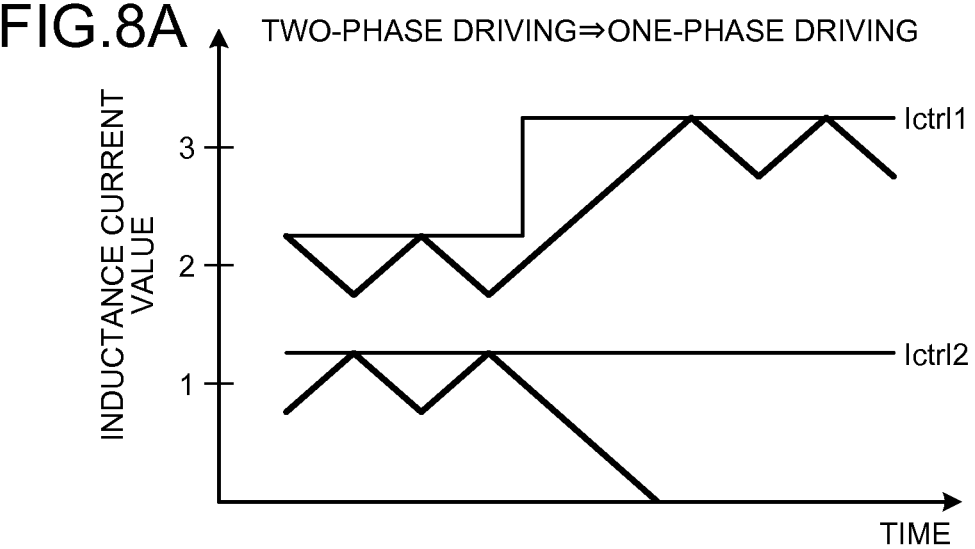
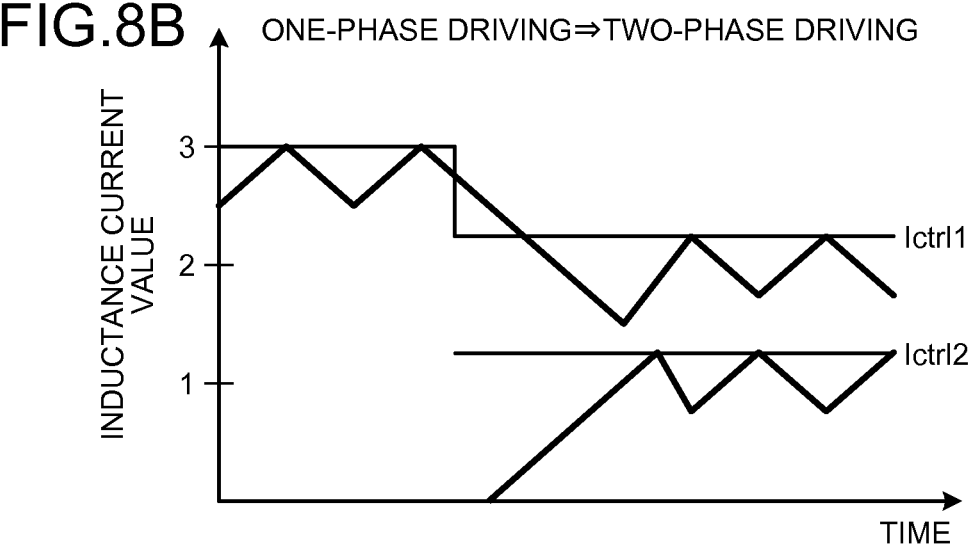

MULTI-PHASE POWER CIRCUIT

CROSS-REFERENCE TO RELATED APPLICATIONS

This application is based upon and claims the benefit of priority from Japanese Patent Application No. 2013-42794, filed on Mar. 5, 2013; the entire contents of which are incorporated herein by reference.

FIELD

Embodiments described herein relate generally to a multi-phase power circuit.

BACKGROUND

In the related art, there is disclosed a so-called multi-phase power circuit which operates a plurality of DC/DC converters in parallel, shifts the phases of the output currents of the respective DC/DC converters, and combines the output currents so as to obtain a stable output at a low ripple.

However, in the related technology, the output currents of the respective DC/DC converters are controlled to be equal to each other. There is room for improvement in that the power circuit having a high conversion efficiency is provided in accordance with a load current.

BRIEF DESCRIPTION OF THE DRAWINGS

FIGS. 8A and 8B are diagrams illustrating an example of an output current of the power circuit according to the third embodiment.

DETAILED DESCRIPTION

In general, according to an embodiment, a power circuit includes an input terminal, an output terminal, a first DC/DC converter which receives a DC input voltage supplied to the input terminal and supplies a first phase output current to the output terminal, a second DC/DC converter which receives the DC input voltage supplied to the input terminal and supplies an output current lower than the first output current to the output terminal in a second phase which is different from the first phase, and a control circuit which controls operations of the first and second DC/DC converters.

Exemplary embodiments of a power circuit will be explained below in detail with reference to the accompanying drawings. However, the present invention is not limited by the embodiments.

Figure 1:
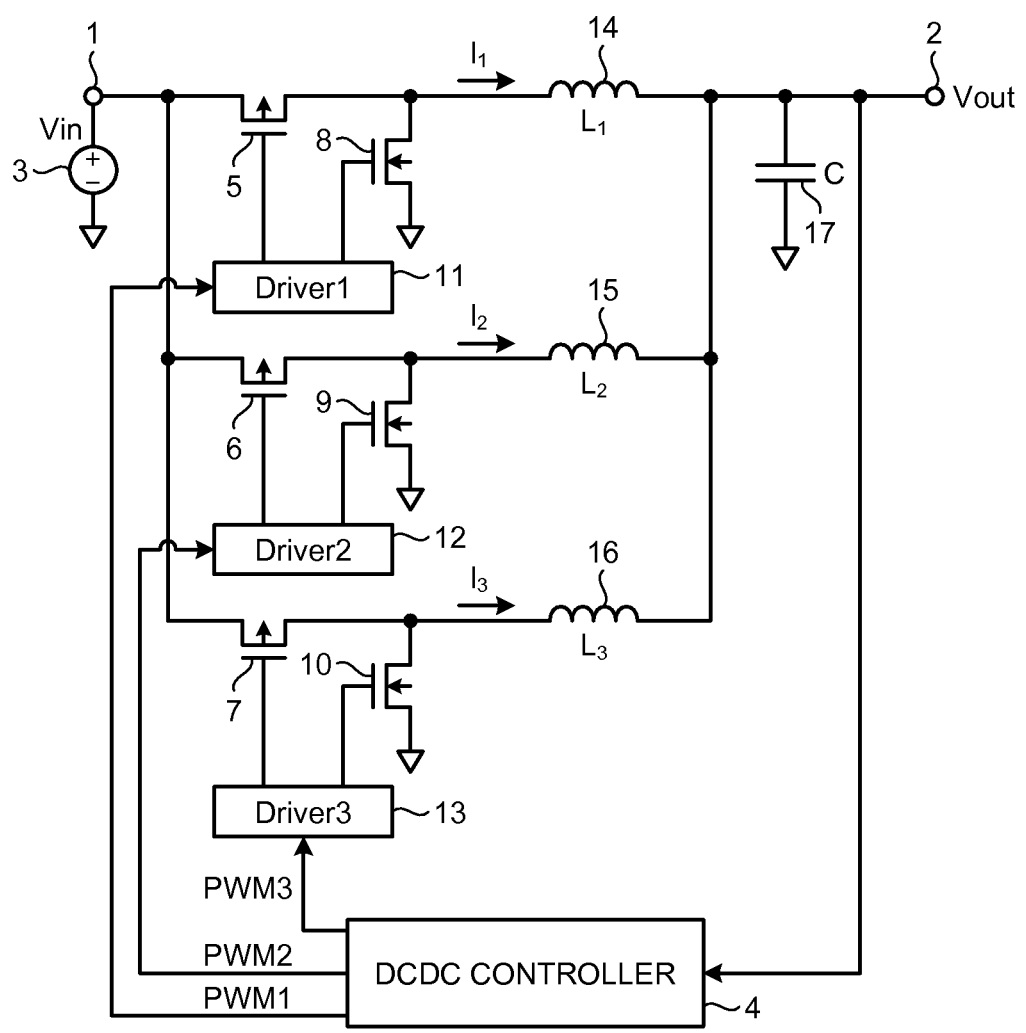
FIG. 1 is a diagram illustrating a power circuit according to a first embodiment.

FIG. 1 is a diagram illustrating a power circuit according to a first embodiment. The power circuit according to the first embodiment includes an input terminal 1. A DC power source 3 is connected to the input terminal 1. The power circuit according to the first embodiment includes an output terminal 2. One end of a capacitor 17 is connected to the output terminal 2 and the other end of the capacitor 17 is grounded. An output voltage Vout is output from the output terminal 2 and then supplied to a predetermined load circuit (not illustrated). The power circuit according to the first embodiment includes a first DC/DC converter which includes a PMOS switching transistor 5, an NMOS switching transistor 8, an inductor 14, and a driver circuit 11. A source electrode of the PMOS switching transistor 5 is connected to the input terminal 1 and a drain electrode thereof is connected to one end of the inductor 14. The other end of the inductor 14 is connected to the output terminal 2. A drain electrode of the NMOS switching transistor 8 is connected to one end of the inductor 14 and a source electrode thereof is grounded. The PMOS switching transistor 5 and the NMOS switching transistor 8 are controlled to be on/off by an output signal from the driver circuit 11. The output voltage and the output current I1 of the first DC/DC converter are controlled by controlling a ratio (duty) of on/off of the PMOS switching transistor 5 and the NMOS switching transistor 8.

The power circuit according to the first embodiment includes a second DC/DC converter which includes a PMOS switching transistor 6, an NMOS switching transistor 9, an inductor 15, and a driver circuit 12. A source electrode of the PMOS switching transistor 6 is connected to the input terminal 1 and a drain electrode thereof is connected to one end of the inductor 15. The other end of the inductor 15 is connected to the output terminal 2. A drain electrode of the NMOS switching transistor 9 is connected to one end of the inductor 15 and a source electrode thereof is grounded. The PMOS switching transistor 6 and the NMOS switching transistor 9 are controlled to be on/off by an output signal from the driver circuit 12. The output voltage and the output current I2 of the second DC/DC converter are controlled by controlling a duty of on/off of the PMOS switching transistor 6 and the NMOS switching transistor 9.

The power circuit according to the first embodiment includes a third DC/DC converter which includes a PMOS switching transistor 7, an NMOS switching transistor 10, an inductor 16, and a driver circuit 13. A source electrode of the PMOS switching transistor 7 is connected to the input terminal 1 and a drain electrode thereof is connected to one end of the inductor 16. The other end of the inductor 16 is connected to the output terminal 2. A drain electrode of the NMOS switching transistor 10 is connected to one end of the inductor 16 and a source electrode thereof is grounded. The PMOS switching transistor 7 and the NMOS switching transistor 10 are controlled to be on/off by an output signal from the driver circuit 13. The output voltage and the output current I3 of the third DC/DC converter are controlled by controlling a duty of on/off of the PMOS switching transistor 7 and the NMOS switching transistor 10.

The power circuit according to the first embodiment includes a DC/DC controller 4 which supplies predetermined control signals PWM1 to PWM3 to the respective driver circuits 11 to 13 of the power circuit. On/off timings of the PMOS switching transistors 5 to 7 and the NMOS switching transistors 8 to 10 of the power circuit are controlled at rising and falling timings of the control signals PWM1 to PWM3. In other words, phases of the output currents of the power circuit may be controlled by the control signals PWM1 to PWM3. The DC/DC controller 4 receives an output voltage Vout and supplies the control signals PWM1 to PWM3 to the driver circuits 11 to 13 of the power circuit so that the output voltage Vout becomes a desired voltage.

Figure 2:
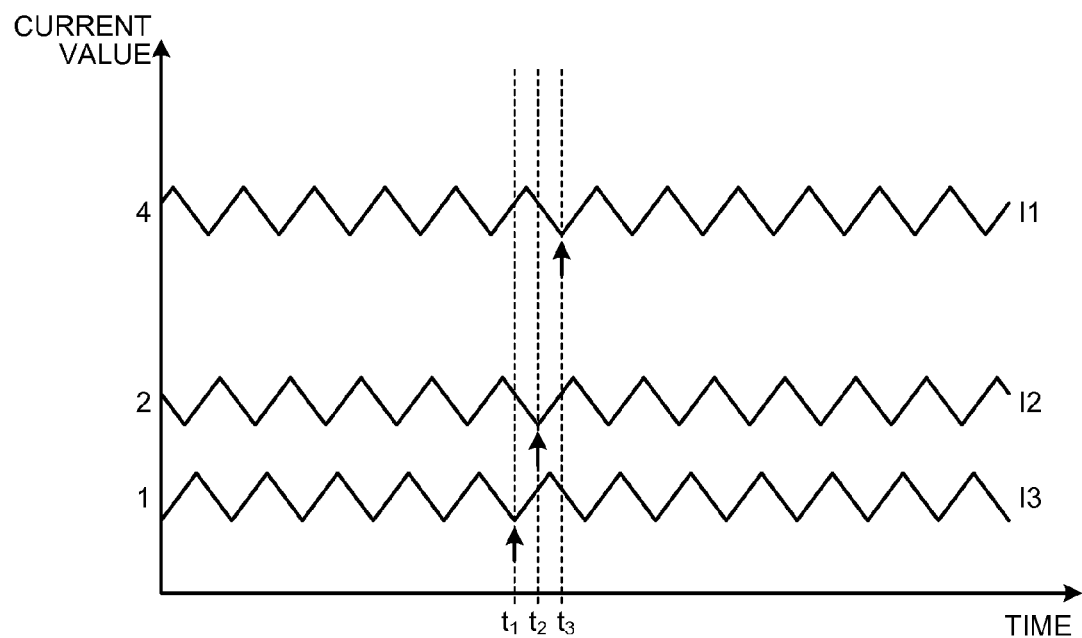
FIG. 2 is a diagram illustrating a first control example of an output current of the power circuit according to the first embodiment.

FIG. 2 is a diagram illustrating a first control example of an output current of the power circuit according to the first embodiment. In the first control example, values of the output current I1 of the first power circuit, the output current I2 of the second power circuit, and the output current I3 of the third power circuit are different from each other. The output current I2 of the second power circuit is twice (an average value) of the output current I3 of the third power circuit and the output current I1 of the first power circuit is four times (an average value) of the output current I3 of the third power circuit. A size of the PMOS switching transistor 6 of the second power circuit is twice of the size of the PMOS switching transistor 7 of the third power circuit and similarly a size of the PMOS switching transistor 5 of the first power circuit is four times of the size of the PMOS switching transistor 7 of the third power circuit to adjust the output current. If gate lengths are same, a gate width is set to be twice or four times to perform the above adjustment. Alternatively, the number of PMOS switching transistors having the same size is adjusted such that the PMOS transistor 7 of the third power circuit is composed of one PMOS switching transistor, the PMOS transistor 6 of the second power circuit is composed of two PMOS switching transistors, and the PMOS transistor 5 of the first power circuit is composed of four PMOS switching transistors to adjust the value of the output current. Similarly, the size or the number of NMOS switching transistors 8 to 10 is adjusted. Further, the relation of sizes of the output current I1 to I3 may not be integral multiple.

Phases of the output currents I1 to I3 are adjusted. A rising timing t2 of the output current I2 of the second power circuit rises, for example, at a 120 degree delayed timing from a rising timing t1 of the output current I3 of the third power circuit. Similarly, the output current I1 of the first power circuit rises at a 240 degree delayed timing t3 from the rising timing t1 of the output current I3 of the third power circuit. The phases of the PWM signals PWM1 to PWM3 from the DC/DC controller 4 are adjusted to adjust the phase of the output current of each of the power circuits. The phases of the output currents I1 to I3 of the power circuits are shifted from each other to reduce a ripple of the output voltage Vout.

Further, the output currents I1 to I3 of three power circuits are combined to increase a current which is supplied from the output terminal 2 to a load (not illustrated). Furthermore, current values of the output currents I1 to I3 of the power circuits vary to change the combination of the combined values. The output current value may be adjusted in accordance with a status of the load. In this embodiment, because three output currents I1 to I3 having different current values are combined, there are eight choices for the combination (2³ choices). When an N-phase multi-phase configuration is provided, 2N choices for combination may be available.

Figure 3:
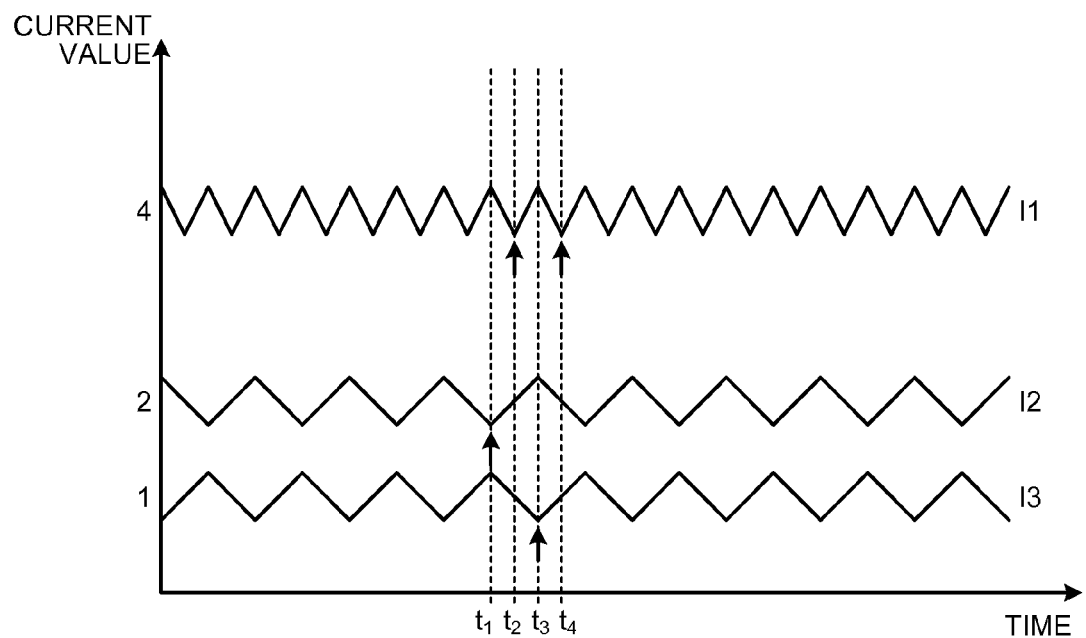
FIG. 3 is a diagram illustrating a second control example of an output current of the power circuit according to the first embodiment.

FIG. 3 is a diagram illustrating a second control example of an output current of the power circuit according to the first embodiment. In the control example of FIG. 3, the output current I1 of the first power circuit has four times of a current value (average current) of the output current I3 of the third power circuit and twice of a frequency thereof. When a frequency of the output current I1 of the first power circuit is increased to be double, a value of the inductor 14 of the first power circuit becomes smaller than the values of the inductors 15 and 16 of the other power circuits. The value of the inductor 14 is lowered and thus it is possible to cope with the fast change in the output current I1 of the first power circuit. By rapidly changing the output current I1 of the first power circuit, it is possible to promptly cope with the change in the load current. Further, phases of the output currents I2 and I3 of the second and third power circuits are adjusted to be different from each other by 180 degrees. The rising timing t1 of the output current I2 is shifted from the rising timing t3 of the output current I3 by 180 degrees. A magnitude relation (mountain and valley) of the output currents I2 and I3 is balanced out and the ripple of the output voltage Vout may be suppressed. Further, the magnitude of the ripple of the output current I1 is suppressed by increasing the frequency of the output current I1 of the first power circuit so that the ripple of the output voltage is also suppressed. Further, since the frequencies of the output currents I2 and I3 of the second and third power circuits are equal to each other, the values of the inductors 15 and 16 are set to be equal to each other.

Figure 4:
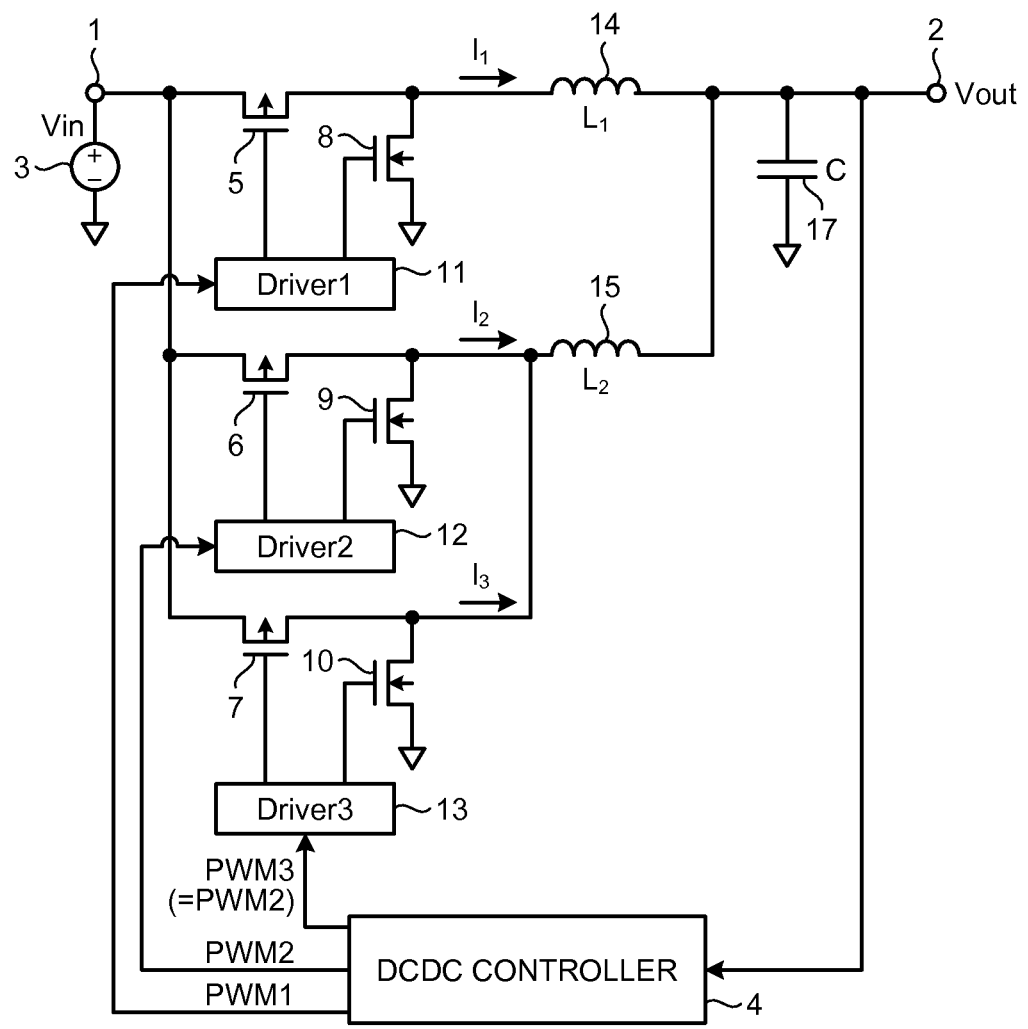
FIG. 4 is a diagram illustrating a power circuit according to a second embodiment.

FIG. 4 is a diagram illustrating a power circuit according to a second embodiment. Components corresponding to the components of the above-described embodiment are denoted by the same reference numerals and the description thereof will not be provided. In the second embodiment, the output current I2 of the second power circuit and the output current I3 of the third power circuit are supplied to the output terminal 2 through the common inductor 15. The second and third power circuits are controlled such that switching frequencies are set to be equal to each other and the frequencies and phases of the output currents I2 and I3 match with each other. The PWM signals PWM2 and PWM3 which are supplied to the driver circuits 12 and 13 from the DC/DC controller 4 are adjusted to be equal to each other so that the frequencies and the phases of the output currents I2 and I3 of the second and third power circuits may be equal to each other, respectively.

According to the second embodiment, since the output currents I2 and I3 of the second and third power circuits are supplied to the output terminal 2 through the common inductor 15, the number of inductors may be reduced. The phase of the output current I1 of the first power circuit is shifted from the phases of the output currents I2 and I3 of the second and third power circuits by 180 degrees so that the ripple of the output voltage Vout may be suppressed. Values (average value) of the output currents I1 to I3 are set to be equal to the combined value of the output currents I1 to I3 of the above-described first embodiment so that an output current which is equal to the output current of the first embodiment may be supplied to the output terminal 2.

Figure 5:
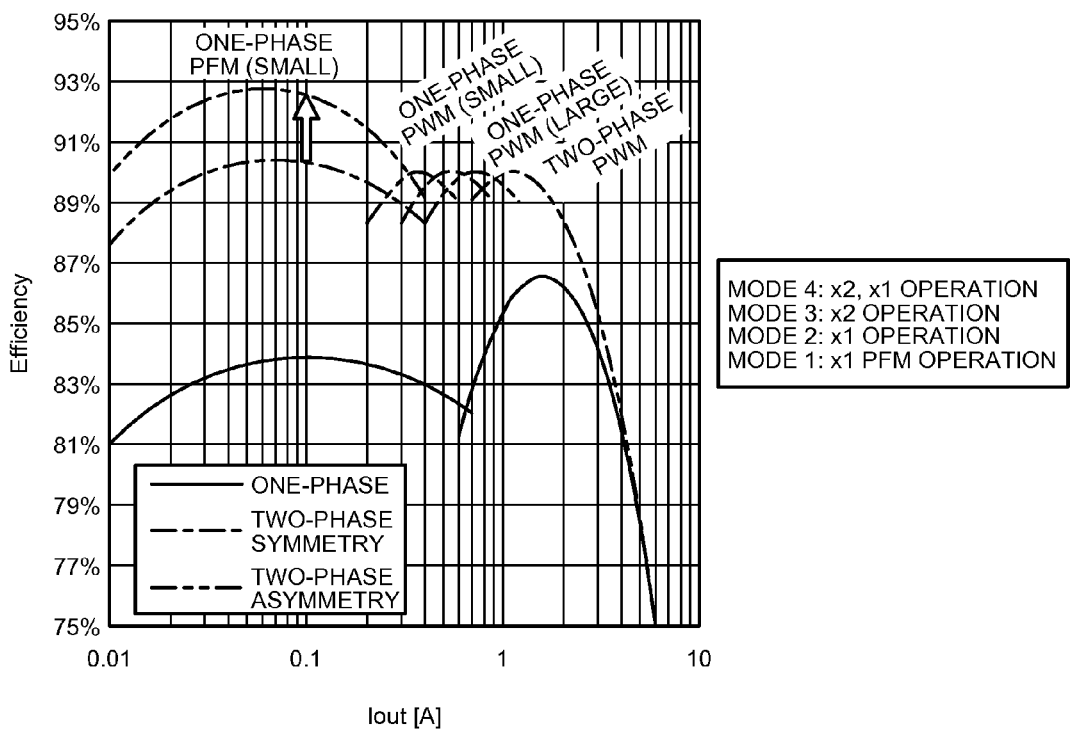
FIG. 5 is a diagram illustrating a relation between a control mode of the output current and a conversion efficiency.

FIG. 5 is a diagram illustrating a relation between a control mode of the output current and a conversion efficiency. A horizontal axis represents a load current and a vertical axis represents a conversion efficiency. Here, the conversion efficiency indicates a conversion efficiency from a DC input voltage Vin into an output voltage Vout. FIG. 5 illustrates a simulation result obtained by comparing conversion efficiencies of a one-phase power circuit (in FIG. 5, indicated by a solid line and represented as ONE-PHASE), a power circuit having a two-phase multi-phase configuration in which the output currents have the same value (in FIG. 5, indicated by a one-dot chain line and represented as TWO-PHASE SYMMETRY), and a power circuit having a two-phase multi-phase configuration in which output currents are different from each other (in FIG. 5, indicated by two-dot chain line and represented as TWO-PHASE ASYMMETRY).

As a control mode of the two-phase multi-phase configuration illustrated in FIG. 5, four modes are used. A mode 1 is a mode where only a power circuit with a low output current operates and pulse frequency modulation (PFM) is performed. In FIG. 5, the mode 1 is represented as ONE-PHASE PFM (SMALL). A mode 2 is a mode where only the power circuit with a low output current operates by the pulse width modulation (PWM). In FIG. 5, the mode 2 is represented as ONE-PHASE PWM (SMALL). A mode 3 is a mode where only a power circuit with a high output current operates by the PWM. In FIG. 5, the mode 3 is represented as ONE-PHASE PWM (LARGE). A mode 4 is a two-phase multi-phase operation mode where both a power circuit with a high output current and a power circuit with a low output current operate by the PWM. In FIG. 5, the mode 4 is represented as TWO-PHASE PWM.

The conversion efficiency is affected by a power which is consumed by an on/off operation of a switching transistor of the power circuit. Accordingly, when a load current Iout is low, if only the power circuit with a low output current operates and is controlled in a mode where a switching frequency is lowered by the PFM, the best efficiency may be obtained. A driving mode of the power circuits having different output current values is switched in accordance with a condition of the load current so that a power circuit in which the conversion efficiency is improved may be provided. As described in the above embodiment, with the configuration where the power circuits having different output currents are driven in multi-phases, the driving mode may be switched into a driving mode in which the conversion efficiency is high in accordance with the load current. Specifically, in the case of a light load with a low load current, only the power circuit with a low output current operates and is controlled in a driving mode with low power consumption so that the control may be performed with a high conversion efficiency. As illustrated in FIG. 5, when the driving mode is switched in accordance with the load current Iout, a power circuit with a two-phase multi-phase configuration in which output currents are different from each other (in FIG. 5, indicated by two-dot chain line and TWO-PHASE ASYMMETRY) may be controlled to have the highest conversion efficiency. A specific example of the control using a relation between the mode illustrated in FIG. 5 and the conversion efficiency will be described below.

Figure 6:
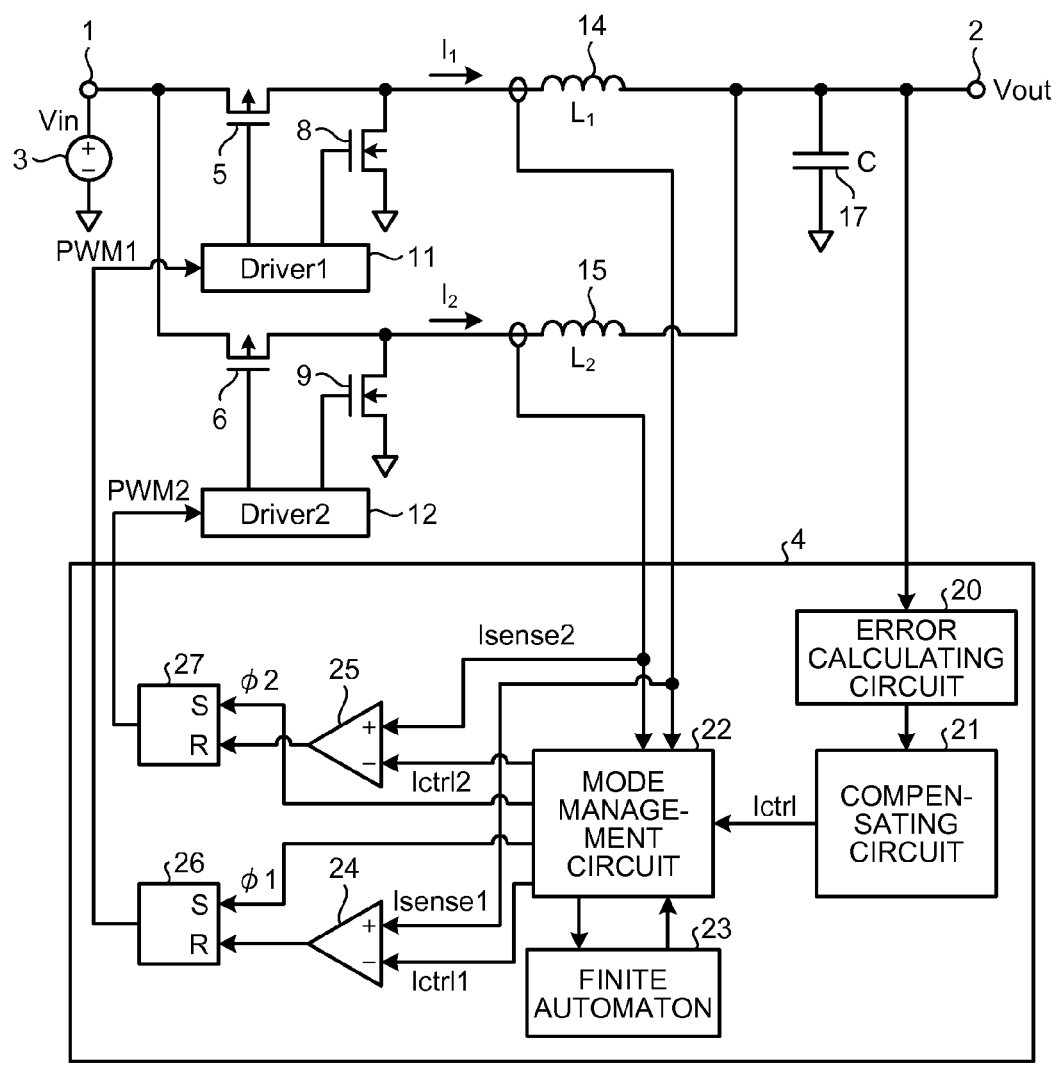
FIG. 6 is a diagram illustrating a power circuit according to a third embodiment.

FIG. 6 is a diagram illustrating a power circuit according to a third embodiment. Components corresponding to the components of the above-described embodiment are denoted by the same reference numerals and the description thereof will not be provided. In the third embodiment, an example of a two-phase multi-phase power circuit will be described. The third embodiment includes the DC/DC controller 4 which controls the output voltage Vout to be a desired voltage. The DC/DC controller 4 includes an error calculating circuit 20 to which information on the output voltage Vout is input. The error calculating circuit 20 compares a predetermined reference voltage Vref (not illustrated) with information on the output voltage Vout and supplies a differential signal to a compensating circuit 21. The compensating circuit 21 receives an output of the error calculating circuit 20, performs proportional integral derivative (PID) control such that the output voltage Vout is equal to the reference voltage Vref, and supplies a control signal Ictrl for the control to a mode management circuit 22.

Information on the output currents I1 and I2 of the first and second power circuits is input to the mode management circuit 22. The information on the load current may be obtained from a total of the output currents I1 and I2. The mode management circuit 22 supplies the information on the supplied output currents I1 and I2 and information on the control signal Ictrl from the compensating circuit 21 to a finite automaton 23. The finite automaton 23 has information on control mode of the power circuit with information on a threshold value to be migrated into the control mode (hereinafter, referred to as a mode threshold value), and has a comparing circuit (not illustrated) which compares information on the output currents I1 and I2 supplied from the mode management circuit 22 or the control signal Ictrl supplied from the compensating circuit 21 with the mode threshold value. The finite automaton 23 supplies a selecting signal of the control mode to the mode management circuit 22 based on the comparison result of the output currents I1 and I2 or the control signal Ictrl with the mode threshold value. The control mode mentioned herein is control modes 1 to 4 set in accordance with the amplitude of the load current described with reference to FIG. 5.

The mode management circuit 22 supplies control signals Ictrl1 and Ictrl2 which control the output currents I1 and I2 of the first and second power circuits to comparing circuits 24 and 25. The comparing circuits 24 and 25 compare the control signals Ictrl1 and Ictrl2 with sensing signals Isense1 and Isense2 of the output currents I1 and I2. If the sensing signals Isense1 and Isense2 are higher than the control signals Ictrl1 and Ictrl2, the comparing circuits 24 and 25 supply a reset signal to RS latch circuits 26 and 27. The mode management circuit 22 supplies clock signals $\phi 1$ and $\phi 2$ to set input terminals of the RS latch circuits 26 and 27. The RS latch circuits 26 and 27 output PWM signals PWM1 and PWM2 whose rising is controlled by the clock signals $\phi 1$ and $\phi 2$ and falling is controlled by the output signals of the comparing circuits 24 and 25. The PWM signals PWM1 and PWM2 are supplied to the driver circuits 11 and 12 of the power circuits.

The risings of the PWM signals PWM1 and PWM2 are controlled by the clock signals $\phi 1$ and $\phi 2$ from the mode management circuit 22. When both clock signals $\phi 1$ and $\phi 2$ are supplied, a two-phase multi-phase power circuit is provided. For example, if the control which does not supply one clock signal $\phi 1$ is performed, a one-phase power circuit is provided. When a control with a low load current, that is, the control by the mode 1 is set, the mode 1 is set by the mode management circuit 22. The fallings of the PWM signals PWM1 and PWM2 are controlled by the comparison result of the output currents I1 and I2 of the power circuit with the control signals Ictrl1 and Ictrl2 by the comparing circuits 24 and 25. That is, the output currents I1 and I2 are controlled so as not to exceed the control signals Ictrl1 and Ictrl2. For example, by setting a value of Ictrl1 to be twice of the Ictrl2, the control may be performed so that the output current I1 of the first power circuit is set to be twice of the output current I2 of the second power circuit.

According to the third embodiment, a mode threshold value which is appropriately set is compared with a detected output current and the control mode may be switched in accordance with the load current. When the load current is low, control which operates only a power circuit with lower power consumption is performed so that control with a higher conversion efficiency may be performed.

Figure 7:
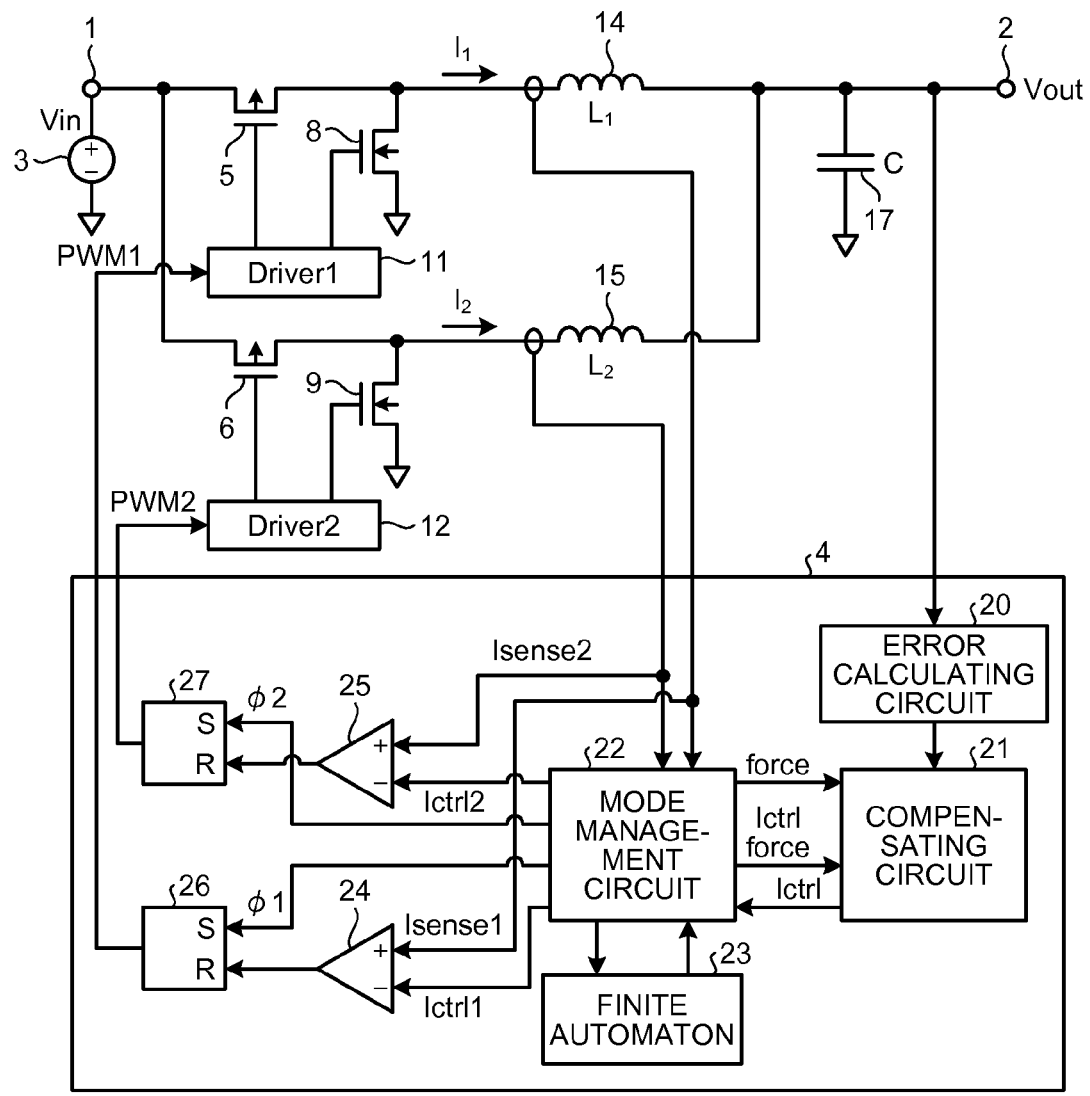
FIG. 7 is a diagram conceptually illustrating control of the power circuit according to the third embodiment.

FIG. 7 is a diagram conceptually illustrating control of the power circuit according to the third embodiment. Components corresponding to the components of the above-described embodiment are denoted by the same reference numerals and the description thereof will not be provided. A compensating circuit 21 of the DC/DC controller 4 includes an arithmetic circuit (not illustrated) which calculates the control signal Ictrl based on the output signal from the error calculating circuit 20 and a retaining circuit (not illustrated) which retains an arithmetic result. The retaining circuit is, for example, configured by a flip-flop. In order to switch the operating mode of the power circuit, control (force) which forcibly switches the status of the retaining circuit in the compensating circuit 21 from the mode management circuit 22 and control (Ictrl force) which forcibly rewrites the control signal Ictrl are performed. By such controls, the control signal Ictrl supplied from the compensating circuit 21 may be instantaneously changed. In accordance with the change in the control signal Ictrl, the mode management circuit 22 controls the control signals Ictrl1 and Ictrl2 which are supplied to the comparing circuits 24 and 25 and the clock signals φ1 and φ2 which are supplied to the RS latch circuits 26 and 27.

FIGS. 8A and 8B are diagrams illustrating a control example of an output current of the power circuit according to the third embodiment described with reference to FIG. 7. FIG. 8A illustrates an example when the mode is switched from a two-phase driving mode to a one-phase driving mode, which corresponds to a case when the mode is switched from the mode 4 to the mode 3 as described in FIG. 5. The load current is reduced and the control in the two-phase of multi-phase is switched into the control in the one-phase. In order to suppress the fluctuation of the power voltage due to the change in the output current, when the mode is switched, the control is performed so as not to cause the fluctuation of the output current. In other words, when a sum of the average values of the output currents at the time of the two-phase driving is 3 A (ampere), the control is performed so that the average values of the output currents of the power circuit operating at the time of being switched into the one-phase driving mode becomes 3 A (ampere). Specifically, the supplying of the clock signal φ2 which is supplied from the mode management circuit 22 to the RS latch circuit 27 stops and the driver circuit 12 of the second power circuit is turned off. By doing this, the mode is switched into the one-phase driving mode. Simultaneously, the mode management circuit 22 performs the control (force) which forcibly switches the status of the retaining circuit (not illustrated) of the compensating circuit 21 and the control (Ictrl force) which forcibly rewrites the control signal Ictrl. The average value of the output current I1 is set to be 3 A (ampere) by such controls.

FIG. 8B illustrates an example when the mode is switched from a one-phase driving mode to a two-phase driving mode. The mode is switched from the mode 3 into the mode 4. In accordance with the increase in the load current, the one-phase driving mode is switched into the multi-phase driving mode in some cases. Also in the case of this control, in order to suppress the fluctuation of the power voltage due to the change in the output current, when the mode is switched, control is performed so as not to cause the fluctuation of the output current. In other words, when the average value of the output currents at the time of the one-phase driving is 3 A (ampere), the control is performed so that the sum of the average values of the output currents at the time of being switched into the two-phase driving mode becomes 3 A (ampere). Specifically, the supplying of the clock signal φ2 from the mode management circuit 22 to the RS latch circuit 27 starts and the driver circuit 12 of the second power circuit is turned on. By doing this, the mode is switched into the two-phase driving mode. Simultaneously, the mode management circuit 22 performs the control (force) which forcibly switches the status of the retaining circuit (not illustrated) of the compensating circuit 21 and the control (Ictrl force) which forcibly rewrites the control signal Ictrl. By such controls, the control is performed so that the average value of the output current I1 is 2 A (ampere) and an average value of the output current I2 is 1 A (ampere). By such controls, the mode migrates into the driving mode with two-phase multi-phase configuration and 3 A (ampere) of the average value of the output currents.

In accordance with the load current, control which switches the mode from the one-phase driving mode into the multi-phase mode or from the multi-phase mode into the one-phase driving mode is performed. When the load current is low, only a power circuit with low power consumption and low output current is driven so that the control with a high power conversion efficiency is performed. By suppressing the fluctuation of the output current at the time of switching the driving mode, it is possible to suppress the fluctuation of a power supply voltage. Further, since the control signal Ictrl of the compensating circuit 21 is controlled by the control of the mode management circuit 22, a response of the mode switching is prompt.

Figure 9:
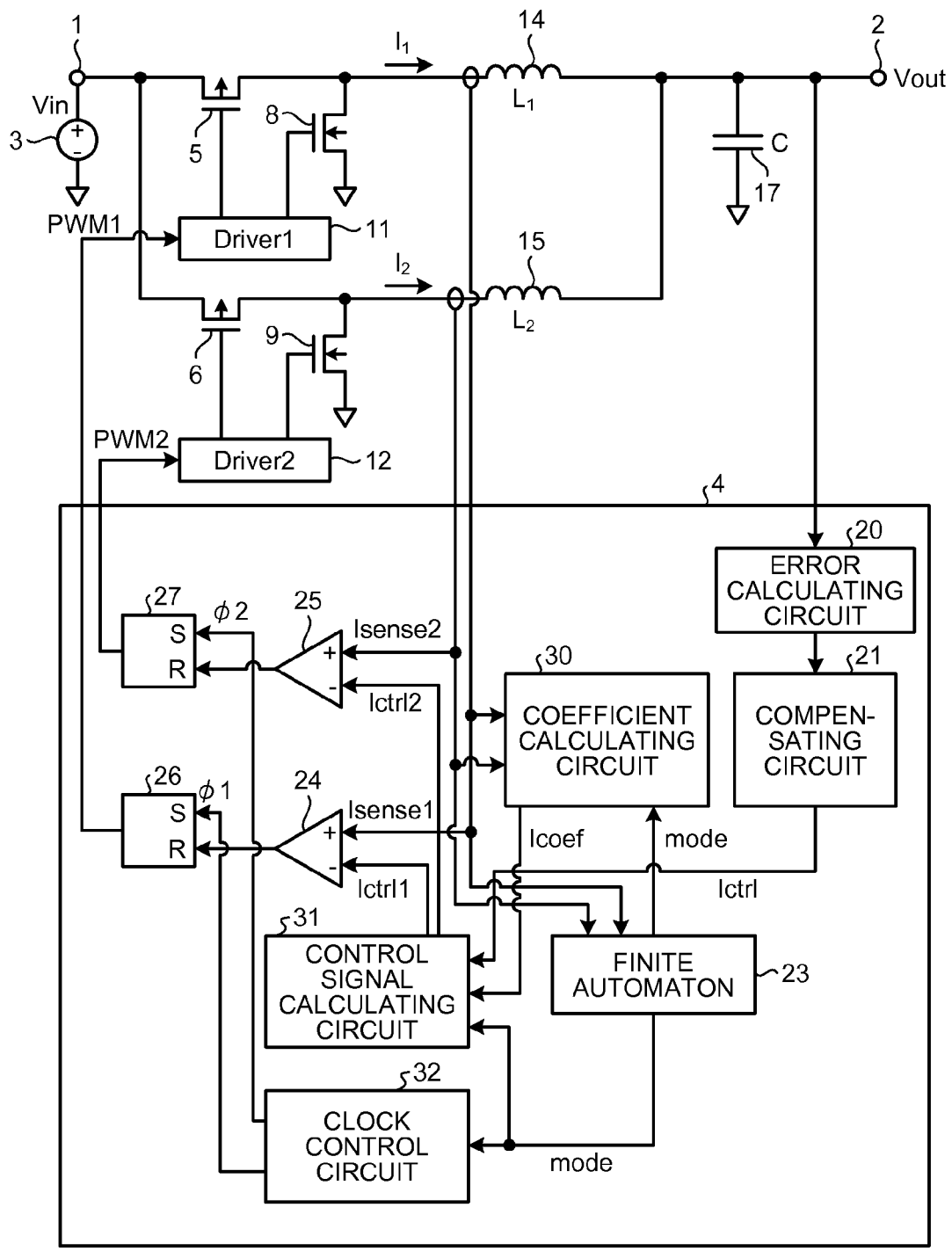
FIG. 9 is a diagram illustrating a power circuit according to a fourth embodiment.

FIG. 9 is a diagram illustrating a power circuit according to a fourth embodiment. Components corresponding to the components of the above-described embodiment are denoted by the same reference numerals and the description thereof will not be provided. In the fourth embodiment, an example of a two-phase multi-phase power circuit will be described. In the fourth embodiment, the information on the output current I1 and the output current I2 is supplied to the finite automaton 23. The information on the load current is obtained from a sum of the output currents I1 and I2. The finite automaton 23 compares the information on the sum of the output currents I1 and I2 with a mode threshold value. The finite automaton 23 selects a mode in accordance with the comparison result and supplies a mode selection signal mode to a coefficient calculating circuit 30, a control signal calculating circuit 31, and a clock control circuit 32. For example, the control signal calculating circuit 31 calculates control signals Ictrl1 and Ictrl2 from the following Equation (1), supplying the signals to each of the comparing circuits 24 and 25.

$$\text{Ictrl}i = \alpha i \times \text{Ictrl} + \delta i \quad (1)$$

Coefficients $\alpha i$ and $\delta i$ are supplied from the coefficient calculating circuit 30 to the control signal calculating circuit 31. The control signal Ictrl is supplied from the compensating circuit 21. For example, when the operation of the second power circuit is stopped to make only the first power circuit operate and the driving mode is switched from the two-phase driving mode into the one-phase driving mode, the coefficient $\alpha 1$ is set to "1" and the output current I1 of the first power circuit is set to be equal to the sum of the output currents of the first power circuit and the second power circuit before the mode is switched. Specifically, in a case where a current value at the time of the two-phase driving is 3 A, the first power circuit is set to output a current of 3 A when the driving mode is switched into the one-phase driving mode. Meanwhile, the coefficient $\alpha 2$ becomes "0". The coefficient $\delta i$ is a coefficient for correcting an error caused between the peak values and the average values of the output currents of the respective power circuits. The coefficient calculating circuit 30 calculates the coefficient based on the information on the output currents I1 and I2 to be supplied.

The clock control circuit 32 supplies the clock signals φ1 and φ2 to the RS latch circuits 26 and 27 according to the mode selection signal mode from the finite automaton 23. For example, the driving mode is switched into the one-phase driving mode driven only by the first power circuit by the control of supplying the clock signal φ1 only to the RS latch circuit 26.

Figure 10A:
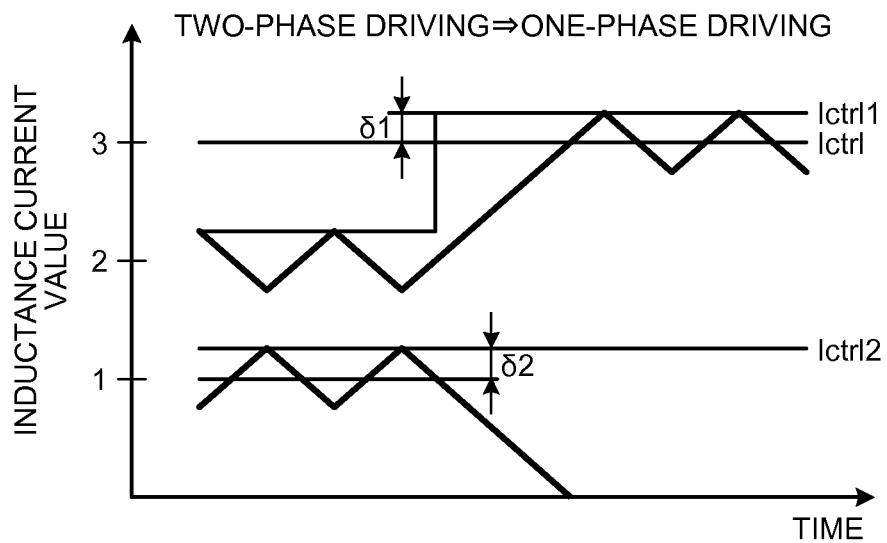
FIGS. 10A and 10B are diagrams illustrating an example of an output current of the power circuit according to the fourth embodiment.
Figure 10B:
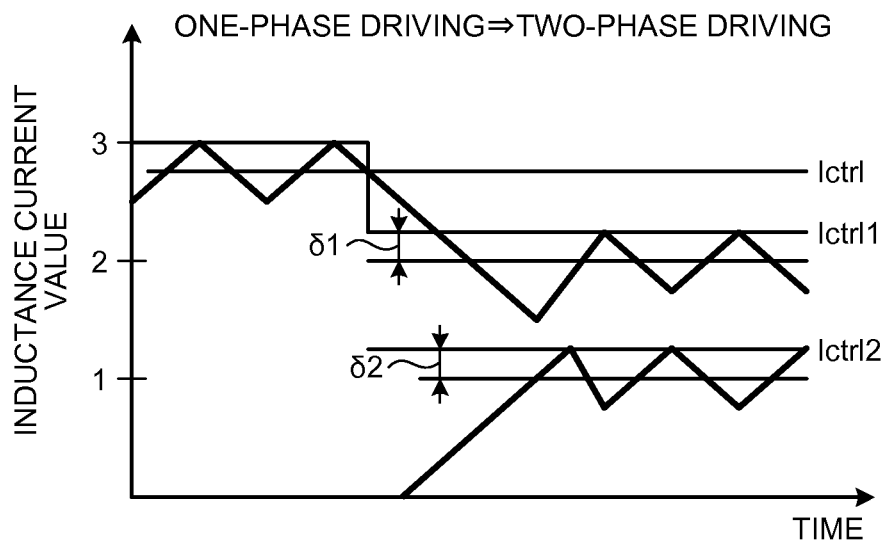

FIGS. 10A and 10B are diagrams illustrating an example of an output current of the power circuit according to the fourth embodiment. FIG. 10A illustrates an example when the mode is switched from the two-phase driving mode into the one-phase driving mode. In this case, the load current is reduced, and the control in the two-phase multi-phase is switched into the one-phase driving mode. In order to suppress the fluctuation of the power voltage due to the change in the output current, the control is performed so as not to cause the fluctuation of the output current when the mode is switched. In other words, when the sum of the average values of the output current at the time of the two-phase driving is 3 A (ampere), the control is performed so that the average value of the output current of the power circuit operating at the time of being switched into the one-phase driving mode becomes 3 A (ampere). For example, the coefficient $\alpha 1$ is set to "1", and the coefficient $\alpha 2$ is set to "0". A correction value $\delta i$ is added to correct the error based on the difference between the peak value and the average value of the output current, so that the control signal Ictrl1 is calculated by the control signal calculating circuit 31 based on the above-mentioned Equation (1) and supplied to the comparing circuit 24. The supplying of the clock signal $\phi 2$ from the clock control circuit 32 to the RS latch circuit 27 is stopped and the driver circuit 12 of the second power circuit is turned off. By doing this, the mode is switched into the one-phase driving mode.

FIG. 10B illustrates an example when the mode is switched from the one-phase driving mode to the two-phase driving mode. In the example, in accordance with the increase in the load current, the one-phase driving mode is switched into the multi-phase driving mode. Also in the case of this control, in order to suppress the fluctuation of the power voltage due to the change in the output current, when the mode is switched, control is performed so as not to cause the fluctuation of the output current. In other words, when the average value of the output current at the time of the one-phase driving mode is 3 A (ampere), the control is performed so that the sum of the average values of the output currents at the time of being switched into the two-phase driving mode becomes 3 A (ampere). For example, the coefficient $\alpha 1$ is set to "⅔", and the coefficient $\alpha 2$ is set to "⅓". By doing this, the control is performed such that the average value of the output current I1 is 2 A (ampere) and the average value of the output current I2 becomes 1 A (ampere). The control signal Ictrl1 and the control signal Ictrl2 are calculated by the control signal calculating circuit 31 based on the above-mentioned Equation (1) in which the correction value Si is added to correct the error based on the difference between the peak value and the average value of the output currents, and the control signals are supplied to the comparing circuits 24 and 25, respectively.

The supplying of the clock signal $\phi 2$ from the clock control circuit 32 to the RS latch circuit 27 starts, and the driver circuit 12 of the second power circuit is turned on. By doing this, the mode is switched into the two-phase driving mode. By such control, the mode migrates into the driving mode with two-phase multi-phase configuration and 3 A (ampere) of the average value of the output current.

When the driving mode of the power circuit is switched between the one-phase driving mode and the two-phase driving mode, the control in which the sum of the output currents is made to be equal to the sum of the output currents before the driving mode is switched is also applicable to the configuration of a symmetric multi-phase power circuit of which the output currents are equal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power circuit, comprising:
    an input terminal which receives a DC input voltage;
    an output terminal which outputs an output voltage;
    an error calculating circuit which outputs an error signal based on a comparison of the output voltage with a reference voltage;
    a compensating circuit which outputs a control signal based on the error signal;
    a first DC/DC converter which receives the DC input voltage and supplies a first output current of a first phase to the output terminal, wherein the first output current is controlled with a first control signal which is obtained by a calculation using the control signal of the compensating circuit;
    a second DC/DC converter which receives the DC input voltage and supplies a second output current lower than the first output current to the output terminal in a second phase which is different from the first phase, wherein the second output current is controlled with a second control signal which is obtained by the calculation using the control signal of the compensating circuit;
    a first current sensor which senses the first output current and outputs a first output current information corresponding to the first output current; and
    a second current sensor which senses the second output current and outputs a second output current information corresponding to the second output current, wherein
    a load current value is obtained by summing the first output current information and the second output current information,
    a control circuit which compares a predetermined mode threshold value associated with a driving mode of the first and second DC/DC converters with the load current value obtained by summing the first and second output current information and stops one of the first and second DC/DC converters in accordance with a comparison result, and
    wherein when the driving mode is switched into a mode which stops one of the first and second DC/DC converters, the control circuit performs to forcibly rewrite a value of the control signal of the compensating circuit to change values of the first and the second control signals such that a value of the output current of the first or second DC/DC converter after the driving mode is switched is equal to a value obtained by summing the output currents of the first and second DC/DC converters before the driving mode is switched, and
    wherein a ratio between average values of the first output current and the second output current is set to a predetermined value.

2. The power circuit according to claim 1, wherein the first DC/DC converter includes a first switching element in which a first electrode is connected to the input terminal and which outputs the first output current from a second electrode, and a first inductance element which is connected between the second electrode of the first switching element and the output terminal, and
    the second DC/DC converter includes a second switching element in which a third electrode is connected to the input terminal and which outputs the second output current from a fourth electrode, and a second inductance element which is connected between the fourth electrode of the second switching element and the output terminal.

3. The power circuit according to claim 2, wherein a switching frequency of the first DC/DC converter is higher than a switching frequency of the second DC/DC converter and an inductance of the first inductance element is lower than an inductance of the second inductance element.

4. The power circuit according to claim 3, wherein a size of the first switching element is larger than a size of the second switching element, wherein the size of the first switching element and the second switching element are adjusted according to the ratio between the average values of the first output current and the second output current.

5. The power circuit according to claim 3, further comprising:
   a third DC/DC converter which operates at the same phase as the second DC/DC converter,
   wherein a third output current of the third DC/DC converter is supplied to the output terminal through the second inductance element.

6. The power circuit according to claim 2, further comprising:
   a third DC/DC converter which receives the DC input voltage supplied to the input terminal and supplies a third output current lower than the second output current to the output terminal in a third phase which is different from the first phase and the second phase, and
   wherein a ratio between average values of the first output current, the second output current and the third output current is set using a multiplier of two.

7. The power circuit according to claim 2, wherein a size of the first switching element is larger than a size of the second switching element, wherein the size of the first switching element and the second switching element are adjusted according to the ratio between the average values of the first output current and the second output current.

8. The power circuit according to claim 7, further comprising:
   a third DC/DC converter which operates at the same phase as the second DC/DC converter,
   wherein a third output current of the third DC/DC converter is supplied to the output terminal through the second inductance element.

* * * * *